Aug. 28, 1962 G. G. MENKEL 3,051,361
FEEDING APPARATUS AND METHOD
Filed Aug. 10, 1959 3 Sheets-Sheet 1

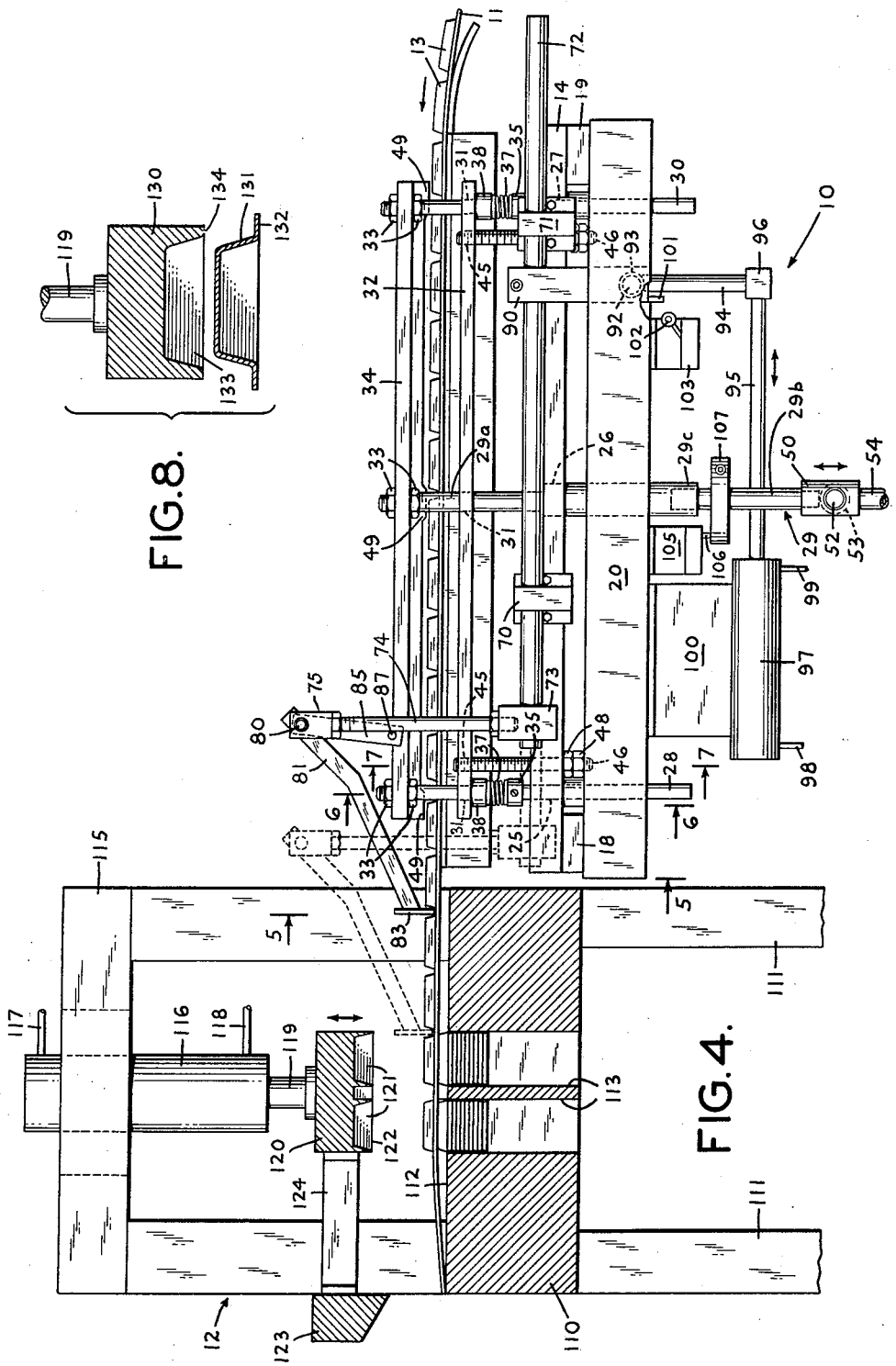

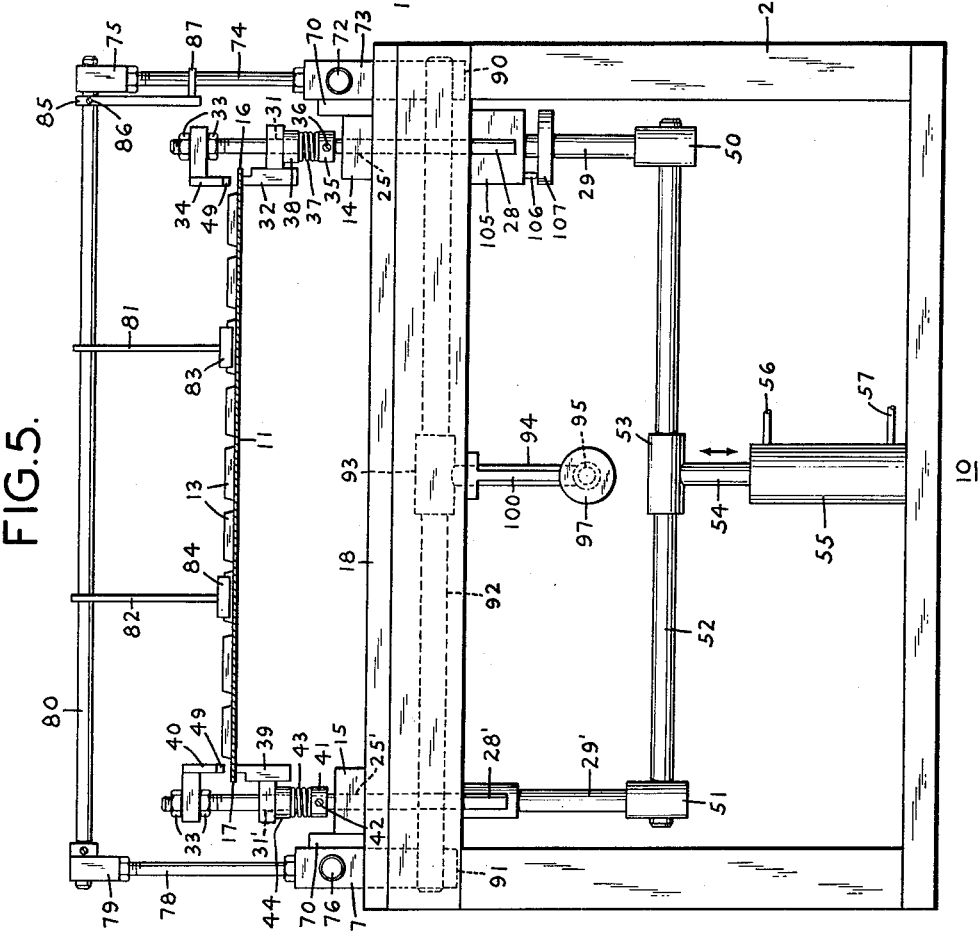

United States Patent Office 3,051,361
Patented Aug. 28, 1962

3,051,361
FEEDING APPARATUS AND METHOD
Gary G. Menkel, Jamaica, N.Y., assignor to Design Center, Inc., Long Island City, N.Y., a corporation of New York
Filed Aug. 10, 1959, Ser. No. 832,584
7 Claims. (Cl. 226—6)

This invention relates to feeding apparatus and methods, and more particularly to such apparatus and methods of the type which are adapted to advance sheet material along a feed path to a predetermined work location.

Apparatus and methods of the type to which the present invention are directed are particularly suited for feeding a continuous web of sheet material having a plurality of shaped work pieces formed thereon in a manner such that each work piece is automatically and accurately fed to a predetermined work location. Thus, for example, such apparatus and methods may be used in the manufacture of containers or like articles to transfer the web of material from a machine where the articles are formed integrally with the web to a blanking mechanism adapted to sever them from the web.

In the great majority of uses for feeding apparatus and methods of this type, it is desirable that the web of material be accurately advanced from the forming machine to the blanking mechanism or other work location in order that each work piece can be precisely located in juxtaposition with the blanking dies, for example. Heretofore, difficulties have been encountered in the feeding of the web to such a precise location, and these difficulties have been of special moment in situations where the spacing between successive work pieces on the web may or may not be uniform. Additionally, the rate at which the shaped work pieces on the web of material heretofore have been led to the work location was determined in many instances by the rate at which the material was fed to the forming machine, with the result that any error in feeding to the forming machine appeared at the work location and had a cumulative effect. The difficulties in registering properly the web of material at the work location have been further complicated in situations where the web is fabricated from certain thermoplastic materials which have a tendency to shrink upon heating.

One general object of this invention, therefore, is to provide a new and improved feeding apparatus which is particularly adaptable for advancing sheet material along a feed path to a predetermined work location. It is also an object of this invention to provide an improved method for feeding sheet material to a predetermined work location.

More specifically, it is an object of this invention to provide such an apparatus and method in which work pieces formed on the web of material are led to the predetermined work location with great accuracy.

Another object of this invention is to provide a feeding apparatus and method of the character indicated in which the web of material is accurately advanced at a rapid rate without mutilation or damage thereto.

Still another object of this invention is to provide a feeding apparatus utilizing comparatively simple mechanical elements, which apparatus is economical to manufacture and thoroughly reliable in operation.

In one illustrative embodiment of this invention, an apparatus for advancing sheet material along a feed path to a predetermined work location comprises a source of a web of the material, the web having a plurality of longitudinally spaced work pieces integrally formed therewith, clamping means for gripping a portion of the web adjacent its longitudinal marginal edges, pusher means spaced from the feed path, first operating means for moving the clamping means, including the web portion gripped thereby, in a direction normal to that of the feed path to a position adjacent the pusher means, and second operating means for moving the pusher means in a direction parallel to the feed path.

In accordance with one feature of this invention, the pusher means is adapted to engage one of the work pieces on the web during its movement and to advance the web a predetermined distance along the feed path toward the work location. Thus, the feeding apparatus registers from the work pieces themselves and affords extremely accurate longitudinal registration of the advancing web.

In accordance with another feature of the invention, the clamping means is adapted firmly and positively to grip the marginal edges of the web upon actuation of the first operating means without mutilation or damage to either the web or to the shaped work pieces thereon.

In accordance with a further feature of the invention, there is provided means responsive to the normal movement of the web for automatically releasing the clamping means, thereby enabling the web to move freely along the feed path at a rapid rate.

The present invention as well as further objects and features thereof will be understood more clearly and fully from the following detailed description of a preferred embodiment thereof, when read in conjunction with the accompanying drawings, in which:

FIGURE 4 is an enlarged side view, partly in section and partly in elevation, of the feeding apparatus shown in FIGURE 1;

FIGURE 5 is a sectional view taken generally along the lines 5—5 in FIGURE 4, with certain parts omitted for purposes of clarity;

FIGURE 6 is a partial sectional view taken generally along the lines 6—6 in FIGURE 4 but illustrating portions of the feeding apparatus in the FIGURE 2 position;

FIGURE 7 is a partial sectional view taken along the lines 7—7 in FIGURE 4 but illustrating portions of the apparatus in the FIGURE 2 position; and FIGURE 8 is a partial sectional view of an alternative blanking mechanism useful in connection with the invention.

Figure 1:
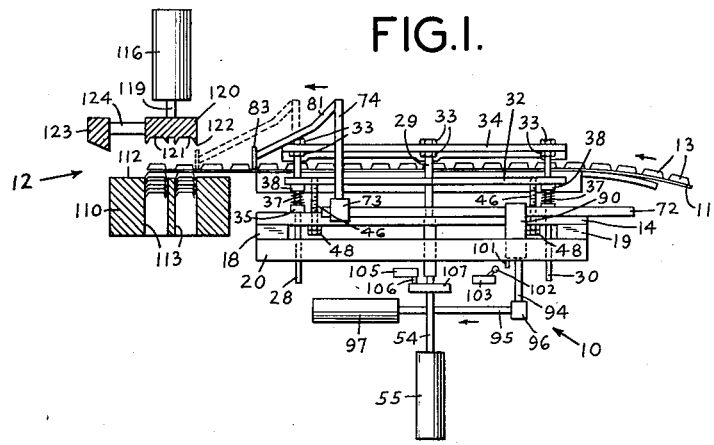
FIGURE 1 is a side view, partly in section and partly schematic, of one form of feeding apparatus constructed in accordance with the invention, together with a representative blanking mechanism to which a web of material is fed.

In the forming of thermoplastic sheet materials, a continuous web of the material is intermittently withdrawn from a reel or spool and customarily is led through a heating zone where the web is conditioned for the forming operation. After a specified time interval, the web is fed from the heating zone to a forming machine where a series of work pieces are formed integrally therewith. As an illustration, the shaping of the work pieces at the forming machine may be accomplished, for example, by mating dies which engage opposite sides of the preconditioned web of material.

The web of material is then withdrawn from the forming machine and is fed by feeding apparatus constructed in accordance with the present invention to a blanking mechanism where the individual work pieces are severed from the web. In some advantageous installations the web of material is led directly from the forming machine to the feeding apparatus, while in other good arrangements the web is fed from the forming machine to a suitable storage reel and is then supplied from this reel to the feeding apparatus. Additionally, in certain particularly advantageous embodiments, the web of material supplied from the forming machine to the feeding apparatus makes a free loop or is otherwise provided with sufficient slack to insure that the feeding of the web to the blanking mechanism is solely under the control of the feeding apparatus.

Although the present invention has particular utility in the feeding of thermoplastic sheet material to a suitable blanking mechanism, it also is highly advantageous for feeding other types of materials to other work locations where highly accurate registration of the material is either necessary or desirable. Thus, in one arrangement, feeding apparatus constructed in accordance with the invention is adapted to accurately position the web of material in a printing machine where appropriate information is printed on the various work pieces.

Referring to the drawings, there is shown a feeding apparatus 10 which is adapted to advance intermittently a web 11 of thermoplastic material along a feed path to a blanking mechanism 12 or other work location. As indicated above, the web 11 is supplied from a suitable source (not shown), such as a forming machine or storage reel, and includes a plurality of rows of containers 13 or other work pieces integrally formed therewith. Each row of containers 13 extends in a direction transverse to the longitudinal direction of the web 11, and the containers in successive rows are longitudinally spaced along the web. In the illustrated embodiment of the invention, the containers 13, and hence the web 11, are fabricated from polarized extruded styrene sheet material.

As best shown in FIGURES 4 and 5, the feeding apparatus 10 includes two spaced parallel frame members 14 and 15 which extend in a direction parallel to that of the web 11 adjacent one side thereof and are respectively spaced from web marginal edges 16 and 17. The spacing between the frame members 14 and 15 preferably is adjustable in order to accommodate different web widths. Members 14 and 15 are supported at their adjacent ends by transverse frame members 18 and 19 positioned on a suitable frame 20 which serves as a support for the feeding apparatus 10.

The longitudinal frame member 14 is provided with three transverse apertures 25, 26 and 27 (FIGURE 4) which respectively accommodate three parallel guide rods 28, 29 and 30 extending in a direction perpendicular to member 14. The apertures 25 and 27 are located adjacent opposite ends of the frame member 14 while aperture 26 is enlarged and is disposed at the approximate longitudinal center of this frame member. The centermost rod 29 is longer than the rods 28 and 30 and includes axially aligned rod sections 29a and 29b which are joined together by a connecting sleeve 29c disposed in the enlarged aperture 26.

Each of the guide rods 28, 29 and 30 extend upwardly, as viewed in FIGURE 4, through corresponding apertures 31 in a lower clamping block 32 and are rigidly affixed at their upper ends by suitable nuts 33 to an upper clamping block 34. The clamping blocks 32 and 34 are longitudinally disposed on opposite sides of the marginal edge 16 of web 11 and extend in directions parallel to this marginal edge. The guide rods 28 and 30 are each provided with an adjustable collar 35 which, as best shown in FIGURE 6, is rigidly held in position on the corresponding rod between the frame member 14 and the lower clamping block 32 by a set screw 36. A coil spring 37 is disposed about each of the rods 28 and 30 between the adjustable collar 35 and a collar 38 which abuts the lower clamping block 32. During a portion of the operation cycle of the apparatus, as will be described in detail hereafter, the coil springs 37 on the rods 28 and 30 serve to push the lower clamping block 32 upwardly toward the upper clamping block 34 to the position shown in FIGURE 6, thereby firmly gripping the marginal edge 16 of the web 11 between these clamping blocks.

In a similar manner, the longitudinal frame member 15 includes three transverse apertures having three parallel guide rods respectively positioned therein. Although only one of these latter apertures, 25', and two of their guide rods, 28' and 29', are visible in the drawings, it will be understood that the remaining apertures and rod are respectively substantially the same as the apertures 26 and 27 and the rod 30 in the frame member 14. The guide rods in the frame member 15 extend upwardly through corresponding apertures 31' (FIGURE 5) in a lower clamping block 39 and are affixed at their upper ends to an upper clamping block 40. The clamping blocks 39 and 40 extend in directions parallel to the longitudinal direction of the web 11 and are disposed on opposite sides of the marginal edge 17. The outer longitudinal rods in frame member 15 are provided with collars 41 which are held in position by set screws 42. Each of these collars supports a coil spring 43 and a collar 44 which are disposed on the corresponding rod in a manner similar to the coil springs 37 and collars 38 on the rods 28 and 30. The collars 44 abut the lower clamping block 39, and the springs 43 serve to bias this clamping block upwardly toward the upper clamping block 40.

Each of the lower clamping blocks 32 and 39 includes a pair of tapped holes 45 which are respectively positioned adjacent the guide rods 28 and 30 in block 32 and adjacent the corresponding guide rods in block 39. As best shown in FIGURE 7, the upper end of an elongated stop member 46 is rigidly inserted in each of the holes 45, and the members 46 each extend downwardly in a direction parallel to that of the adjacent guide rod through an aperture 47 in the corresponding frame member 14 or 15. The lower end of each of the stop members 46 is provided with a pair of adjustable lock nuts 48 which normally are spaced from the corresponding frame member when the clamping blocks are in their closed (FIGURE 7) position.

A plurality of off-set portions 49 depend at spaced intervals from the lowermost portions of the upper clamping blocks 34 and 40. Each of these off-set portions is substantially flat and is adapted to engage the upper surface of one of the web marginal edges 16 or 17, thereby firmly gripping the web at spaced intervals along these marginal edges.

The centrally located guide rods 29 and 29' in the longitudinal frame members 14 and 15, respectively, extend downwardly, as viewed in FIGURES 4 and 5, and are rigidly affixed at their lower ends to connecting blocks 50 and 51. The blocks 50 and 51 are joined by a transverse rod 52 which meets each of the rods 29 and 29' at a right angle and includes a centrally disposed collar 53 affixed thereto. A piston rod 54 is connected at one end to the collar 53 and extends downwardly, as viewed in FIGURE 5, in a direction parallel to that of the rods 29 and 29'. The other end of the piston rod 54 is suitably connected to a piston (not shown) movably disposed in a fluid cylinder 55 which includes a vent 56 and a conduit 57. As will be understood, the piston rod 54, and hence the guide rods 29 and 29' are adapted to move upwardly, as viewed in FIGURE 4, upon the introduction of a suitable fluid into the conduit 57, while these components move in a downward direction upon the release of fluid pressure at the conduit 57.

As best shown in FIGURE 4, two pillow blocks 70 and 71 are mounted on the frame member 14 and accommodate a pusher rod 72 which extends in a direction parallel to the longitudinal direction of the web 11. The rod 72 is adapted for reciprocatory motion in the blocks 70 and 71 and includes a connecting block 73 at the end thereof adjacent the blanking mechanism 12. One end of a transverse rod 74 is fixedly secured to the block 73, and the rod 74 extends upwardly adjacent the marginal edge 16 of web 11 and is attached at its upper end to a connecting block 75.

The longitudinal frame member 15 likewise is provided with two pillow blocks 70 and 71 which support a pusher rod 76 (FIGURE 5). The rod 76 extends in a direction parallel to the longitudinal direction of the web 11 and is affixed at the end thereof adjacent the blanking mechanism to a block 77. The block 77 connects the rod 76 with an upwardly extending rod 78 disposed adjacent the marginal edge 17 of the web 11. A connecting block 79 is fixedly secured to the upper end of the rod 78.

The block 75 on the rod 74 and the block 79 on the rod 78 are maintained in spaced relationship with each other by an elongated rod 80 which extends in a direction transverse to the longitudinal direction of the web 11 and is spaced from the web on the side thereof opposite that of the frame members 14 and 15. The right end of the rod 80, as viewed in FIGURE 5, is journaled in the block 75 while the left rod end is journaled in the block 79. Two pusher arms 81 and 82 are rigidly secured to the rod 80 intermediate the ends thereof and extend downwardly toward the blanking mechanism 12 at approximately a forty-five degree angle. The pusher arms 81 and 82 support pusher members 83 and 84, respectively, which are welded or otherwise affixed to the lower ends of the pusher arms and are each disposed in a plane perpendicular to the plane of the web 11.

During a portion of the operation cycle of the apparatus 10, the pusher members 83 and 84, the arms 81 and 82 and the rod 80 are maintained in fixed relationship with respect to the blocks 75 and 79 and the rods 74 and 78 by means of an adjustment bar 85. The bar 85 is secured to the rod 80 adjacent the connecting block 75 by a set screw 86, and bar 85 extends downwardly and includes a transverse pin 87 at its lower end. The pin 87 is adapted to abut the rod 74 on the side thereof adjacent the arms 81 and 82 and thereby prevent these arms, together with the pusher members 83 and 84 attached thereto, from rotating in a counterclockwise direction, as viewed in FIGURE 4, about the axial center of the rod 80.

Two clamps 90 and 91 are rigidly secured to the pusher rods 72 and 76, respectively, intermediate the pillow blocks 70 and 71. Each of these clamps depends from the corresponding pusher rod and is connected at its lower end to a transverse shaft 92. As best shown in FIGURE 5, the shaft 92 includes a collar 93 which is fixedly secured intermediate the ends thereof and is connected to one end of a vertically disposed rod 94. The other end of the rod 94 is secured to one end of a horizontal piston rod 95 by a connecting block 96 (FIGURE 4). A piston (not shown) is affixed to the other end of the rod 95 and is disposed in a fluid cylinder 97 which includes conduits 98 and 99. The cylinder 97 is secured to the frame 20 by a bracket 100. Upon the introduction of a suitable fluid into the conduit 99, the piston rod 95 is adapted to move to the left, as viewed in FIGURE 4, while this rod moves to the right upon insertion of fluid in the conduit 98.

The clamp 90 is provided with a pin 101 which depends therefrom and is adapted to engage an actuating roller 102 of a microswitch 103 upon movement of the pin 101 to the left, as viewed in FIGURE 4. The microswitch 103 is mounted on the frame 20 and is electrically connected to an appropriate solenoid-actuated valve in the conduit 57 (FIGURE 5) of the cylinder 55. For purposes of convenience this valve, together with the electrical connections leading thereto, have not been shown in the drawings.

A microswitch 105 is mounted on the frame 20 adjacent the guide rod 29 and includes an actuating pin 106 which is adapted to be engaged by a bracket 107 on the guide rod 29 when this rod approaches its uppermost (FIGURES 1, 4 and 5) position. The microswitch 105 is electrically connected to suitable valves (not shown) in the conduits 98 and 99 of cylinder 97. Upon actuation, the microswitch is adapted to initiate the application of fluid pressure through the conduit 99 to thereby move the piston rod 95 toward the blanking mechanism 12. Upon the deenergization of the microswitch 105 and after a suitable time delay, fluid pressure is applied to the conduit 98 and the conduit 99 is vented, thereby returning piston rod 95 to its initial position.

The blanking mechanism 12 comprises a die 110 which is supported by legs 111 and includes a substantially flat horizontal surface 112 adapted to receive the web 11 from the outfeed side of the feeding apparatus 10. The die 110 is provided with a plurality of rectangular apertures 113 extending therethrough from the surface 112 which are aligned in two parallel rows transverse to the longitudinal direction of the web 11.

Extending upwardly from the die 110 is a yoke 115 which supports a vertically disposed fluid cylinder 116. Cylinder 116 includes two conduits 117 and 118 at opposite ends thereof. A piston (not shown) is disposed inside the cylinder and is connected to one end of a piston rod 119. The opposite end of the rod 119 extends downwardly and is rigidly affixed to an elongated die 120 extending in a direction transverse to that of the web 11. A plurality of rectangular recesses 121 are provided in the surface of die 120 adjacent the surface 112 of die 110 to thereby form a plurality of cutting edges 122 thereon. The configuration of the recesses 121 is substantially the same as that of the containers 13 on the web 11. If desired, the blanking mechanism 12 additionally may be provided with a cutter 123 which is disposed on the outfeed side of mechanism 12 and is rigidly affixed to the male die 120 by a connecting bracket 124. The cutter 123 serves to cut the unused portions of the web 11 into small sections suitable for storage.

Figure 3:
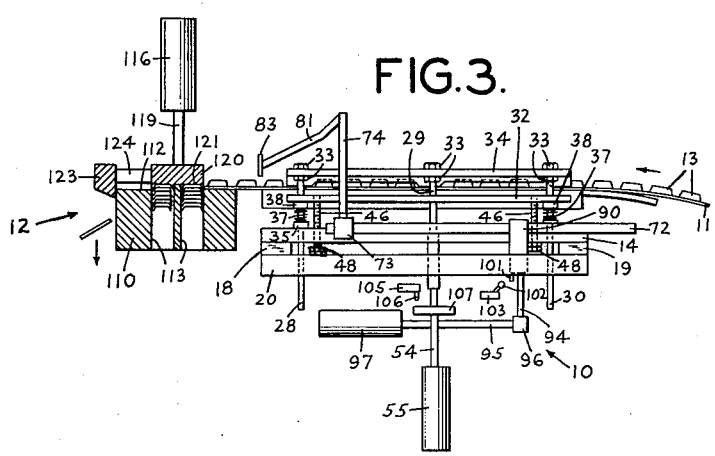
FIGURE 3 is a side view similar to FIGURE 1 but illustrating the blanking mechanism in an actuated position.

At the start of the operation cycle of the feeding apparatus 10 and the blanking mechanism 12, the piston rod 54 is disposed in its lowermost (FIGURE 3) position. In this position, the marginal edge 16 (FIGURE 5) of the web 11 is grasped between the lower clamping block 32 and the upper clamping block 34, while the marginal edge 17 is held between the lower clamping block 39 and the upper clamping block 40. The pressure exerted on these marginal edges by reason of the coil springs 37 and 43 acting upon the lower clamping blocks 32 and 39, respectively, serves to firmly hold the web in position. Additionally, at the start of the operation cycle, the piston rod 95 in the cylinder 97 is disposed toward the right (FIGURES 1, 3 and 4), and fluid pressure from a suitable source (not shown) is applied to the lower conduit 118 of the cylinder 116 to thereby maintain the die 120 of the blanking mechanism 12 in its uppermost position.

To initiate the feeding operation, fluid pressure is applied to the conduit 57 of the cylinder 55, thereby moving the piston rod 54 upwardly to the position shown in FIGURES 1, 4 and 5. During this upward movement, the transverse rod 52 and the guide rods 29 and 29' likewise move in an upward direction, thereby raising the upper clamping blocks 34 and 40. The guide rods 28 and 30 attached to the clamping block 34 and the corresponding guide rods secured to the clamping block 40 similarly move in an upward direction. During a major portion of this upward movement, the lower clamping blocks 32 and 39 are maintained in fixed relationship with their adjacent upper clamping blocks 34 and 40 by means of respective collars 35 and 41, coil springs 37 and 43 and collars 38 and 44, and the web 11 is raised in a direction normal to its longitudinal feed path while being held firmly along its marginal edges 16 and 17.

As the clamping blocks approach their uppermost position, the nuts 48 on the stop members 46 engage the corresponding frame members 14 and 15, thereby arresting upward motion of the lower clamping blocks 32 and 39. The movement of web 11 normal to that of the feed path is likewise arrested, and one of the rows of containers 13 on the web is disposed immediately in front of the pusher members 83 and 84 on the side thereof toward the blanking mechanism 12. The upper clamping blocks 34 and 40, however, continue their upward movement for a short distance. The coil springs 37 and 43 compress, and the marginal edges 16 and 17 of the web 11 are released. The web 11 is thereby conditioned for unrestricted longitudinal movement along its feed path.

As the piston rod 54 reaches the position shown in FIGURE 1, the bracket 107 thereon engages the microswitch pin 106. The microswitch 105 is actuated, and fluid pressure is applied to the right hand portion of cylinder 97 through conduit 99 (FIGURE 4), the conduit 98 being vented. The piston rod 95 in the cylinder 97 moves toward the blanking mechanism 12, and the pusher rods 72 and 76 likewise move toward mechanism 12 by reason of the rod 94, the transverse shaft 92 and the clamps 90 and 91. As the rods 72 and 76 slide in their respective pillow blocks toward the blanking mechanism, the pusher members 83 and 84 engage the adjacent containers 13 on the web 11 and advance the web along its feed path to the blanking mechanism 12. The position of the advanced pusher members 83 and 84 is shown by dotted lines in FIGURE 1 and by full lines in FIGURE 2. The distance that the web 11 is advanced is dependent upon the stroke of the piston rod 95 and is carefully controlled to insure that the rows of containers in the blanking mechanism 12 are accurately aligned with the apertures 113 in the die 110 and with the recesses 121 in the die 120.

As the piston rod 95 moves toward the blanking mechanism, the depending pin 101 on the clamp 90 engages the actuating roller 102, thereby operating the microswitch 103. After a predetermined time delay to insure that the pusher members 83 and 84 have reached their advanced position, the fluid pressure in the lower portion of the cylinder 55 is released, and the piston rod 54, along with the attached guide rods 29 and 29' and the upper clamping blocks 34 and 40, move in a downward direction. During the initial portion of this downward movement, the lower clamping blocks 32 and 39 remain relatively immobile. As soon as the upper clamping blocks 34 and 40 engage the marginal edges 16 and 17 of the web, however, the lower clamping blocks 32 and 39 begin their downward movement, and the web 11 is again firmly clamped along its marginal edges and is moved downwardly to its initial position. The web is rigidly maintained in this position by the clamping blocks during operation of the blanking mechanism 12, thereby preventing the containers 13 from shifting during the blanking operation.

Figure 2:
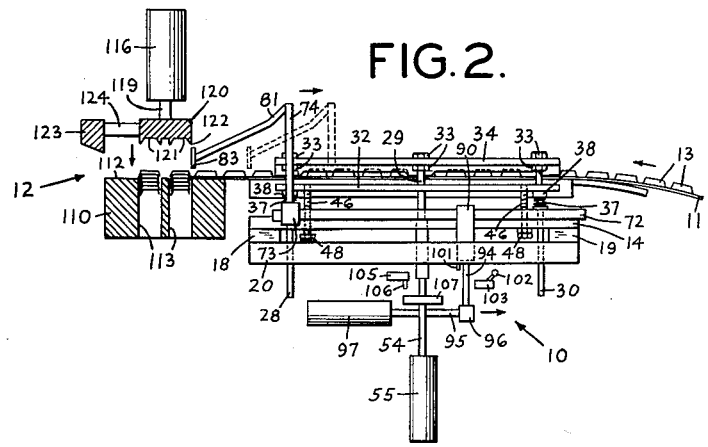
FIGURE 2 is a side view similar to FIGURE 1 but illustrating portions of the feeding apparatus in an advanced position.

At the start of the downward movement of the guide rod 29, the bracket 107 thereon becomes disengaged from the microswitch pin 106, thereby deenergizing the microswitch 105. After a suitable time delay to insure that the web 11 is firmly clamped by the clamping blocks and that the containers 13 have cleared the pusher members 83 and 84, fluid pressure is applied to the conduit 98 of the cylinder 97 and the conduit 99 is vented. The piston rod 95 in cylinder 97 thereby moves to the right, as shown in FIGURE 2, and the pusher members 83 and 84 are returned to their initial position.

Upon the return of the pusher members 83 and 84, a suitable microswitch (not shown) is actuated to thereby initiate the application of fluid pressure to the conduit 117 of the cylinder 116, the conduit 118 being vented. The die 120 moves downwardly to its FIGURE 3 position, and the cutting edges 122 thereon sever the containers 13 from the web. The severed containers drop down through the apertures 113 to a suitable hopper (not shown) or other receiving means.

In a similar manner, the feeding mechanism 10 continues to intermittently advance the web of material 11 along its feed path to the blanking mechanism 12, and mechanism 12 severs the containers 13 from the web. As indicated heretofore, the distance that the web is advanced during each forward stroke of the pusher members 83 and 84 is carefully controlled to insure that the rows of containers are precisely located in the blanking mechanism 12. In the embodiment of the invention illustrated in FIGURES 1 through 7, this distance is substantially equal to the longitudinal distance between the trailing edges of the containers 13 in every other row. Additionally, the pusher members 83 and 84 in their advanced position are in substantially vertical alignment with the rearwardly disposed surfaces of the right hand row of apertures 113. Thus, during each forward stroke of the feeding apparatus 10, a pair of adjacent transverse rows of the containers 13 is accurately aligned in the blanking mechanism 12, and the containers in each of these rows are cleanly severed from the web 11 upon downward movement of the die 120.

For some applications, the feeding apparatus 10 may be adapted to successively advance single containers longitudinally spaced on a web of material, or single transverse rows of containers, during each cycle of the apparatus to a suitable blanking mechanism. A blanking mechanism of this latter type is partially shown in FIGURE 8 and includes an upper die 130 which is rigidly affixed to the piston rod 119 of the cylinder 116. During each cycle of the feeding apparatus 10, the die 130 is adapted to sever a row of containers 131 or other work pieces from a web 132 and is provided with a single transverse row of recesses 133 in the lower horizontal surface thereof. The recesses 133 form cutting edges 134 on this surface which are adapted to sever the individual containers 131 from the web 132.

In feeding the web 132 to the blanking mechanism of FIGURE 8, the stroke of the piston rod 95 of the feeding apparatus 10 is adjusted so that a single transverse row of the containers 131 is fed to the blanking mechanism during each forward cycle of the pusher members 83 and 84. With this arrangement, the distance that the pusher members 83 and 84 advance the web 132 during each cycle is substantially equal to the distance between the trailing edges of the containers 131 in adjacent transverse rows. In general, in accordance with certain preferred embodiments of the invention, the distance that the web of material is advanced during each cycle of the feeding apparatus preferably is equal to an integral multiple of the distance between the trailing edges of adjacent longitudinal containers or other work pieces on the web.

The containers 131 on the web 132 of FIGURE 8 are substantially larger than the containers 13 on the web 11 of FIGURES 1 through 7, and the recesses 133 in the die 130 are likewise enlarged and tend to center the containers 131 in their proper position upon downward movement of the die. In some embodiments, it is advantageous to permit free movement of the web 132 particularly during this downward movement of die 130 in order to facilitate the centering of the containers 131. In these latter embodiments, the clamping blocks 32, 34, 39 and 40 of the feeding apparatus 10 are removed or are otherwise rendered ineffective, and the feeding apparatus 10 is adjusted so that the pusher members 83 and 84 are in juxtaposition with the web in its lowered position during the feeding cycle of the apparatus. Upon the return cycle, the pushers members 83 and 84 pivot in a clockwise direction, as viewed in FIGURE 4, about the axis of the rod 80, and these pusher members ride over the containers 131 until they reach their initial (right hand) position.

As indicated heretofore, the timing of the various sequential operations of the feeding apparatus 10 and the blanking mechanism 12 advantageously is automatically controlled by suitable microswitches, such as the switches 103 and 105, which are operable in response to the termination of the immediately preceding step in the operation cycle. In other good arrangements, the initiation of the various operating means may be otherwise automatically controlled or may be controlled manually in the above described sequence.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. An apparatus for advancing sheet material along a feed path to a predetermined work location, comprising, in combination, a source of a web of said sheet material, clamping means disposed along said feed path for gripping a portion of said web, pusher means movable along said feed path, first operating means for moving said clamping means, including the web portion gripped thereby, in a direction normal to that of said feed path toward said pusher means, and second operating means for moving said pusher means in a direction parallel to said path, said pusher means during the movement thereof engaging said web portion to thereby advance said web along said path toward said predetermined work location.

2. An apparatus for intermittently advancing sheet material along a feed path to a predetermined work location, comprising, in combination, a source of a web of said sheet material, said web including a plurality of longitudinally disposed raised work pieces formed thereon, clamping means positioned along said feed path for gripping a portion of said web, pusher means movable along said feed path, first operating means for moving said clamping means, including the web portion gripped thereby, in a direction normal to that of said feed path to a position adjacent said pusher means, and second operating means for moving said pusher means in a direction parallel to said path, said pusher means during the movement thereof engaging one of the work pieces on said web portion to thereby advance said web along said path toward said predetermined work location.

3. An apparatus for intermittently advancing sheet material along a feed path to a predetermined work location, comprising, in combination, a source of a web of said sheet material, said web including a plurality of longitudinally spaced raised work pieces integrally formed therewith, clamping means disposed along said feed path for gripping a portion of said web adjacent the longitudinal marginal edges thereof, pusher means movable in a direction parallel to said feed path between a first and a second position, said pusher means in its said first position being spaced from said clamping means in a direction normal to that of said feed path and in its said second position being located adjacent said work location, first operating means for moving said clamping means, including the web portion gripped thereby, toward said pusher means when the latter is in said first position, and second operating means for moving said pusher means from said first position toward said second position, said pusher means during the movement thereof engaging one of the work pieces on said web portion to thereby advance said web along said path toward said predetermined work location.

4. An apparatus for intermittently advancing sheet material along a feed path to a predetermined work location, comprising, in combination, a source of a web of said sheet material, said web including a plurality of longitudinally spaced raised work pieces integrally formed therewith, clamping means disposed along said feed path for gripping a portion of said web adjacent the longitudinal marginal edges thereof, pusher means movable along said feed path, first operating means for moving said clamping means, including the web portion gripped thereby, in a direction normal to that of said feed path to a position adjacent said pusher means, means responsive to the movement of said web portion to said position for releasing said clamping means, to thereby permit movement of said web along said path, and second operating means for moving said pusher means in a direction parallel to said path, said pusher means during the movement thereof engaging one of the work pieces on said web portion to thereby advance said web along said path toward said predetermined work location.

5. An apparatus for intermittently advancing sheet material along a feed path to a predetermined work location, comprising, in combination, a source of a web of said sheet material, said web including a plurality of longitudinally spaced raised work pieces integrally formed therewith, clamping means disposed along said feed path for gripping a portion of said web adjacent the longitudinal marginal edges thereof, pusher means movable along said feed path, first operating means for moving said clamping means, including the web portion gripped thereby, in a direction normal to that of said feed path to a position adjacent said pusher means, releasing means automatically responsive to the movement of said web portion to said position for releasing said clamping means, to thereby permit movement of said web along said path, second operating means for moving said pusher means in a direction parallel to said path to said work location, said pusher means during the movement thereof engaging one of the work pieces on said web portion to thereby advance said web a predetermined distance along said path toward said work location, and means responsive to said movement of said pusher means to said work location for returning said clamping means to its position along said feed path, said releasing means being ineffective upon said return, whereby said web is firmly clamped by said clamping means during the performance of work at said work location.

6. A method for advancing sheet material along a feed path to a predetermined work location, comprising clamping along said feed path a web of said sheet material adjacent the longitudinal marginal edges thereof, said web including a plurality of longitudinally spaced raised work pieces formed thereon, moving said web in a direction normal to said feed path to a position adjacent an advancing member, releasing said web to thereby permit movement thereof along said path, and, after said web is released, moving said advancing member in a direction parallel to said feed path, said advancing member engaging one of the work pieces on said web during its movement, to thereby advance said web along said path toward said predetermined work location.

7. A method for advancing sheet material along a feed path to a predetermined work location, comprising clamping along said feed path a web of said sheet material adjacent the longitudinal marginal edges thereof, said web including a plurality of longitudinally spaced raised work pieces integrally formed therewith, moving a portion of said web in a direction normal to said feed path to a position adjacent an advancing member, one of said work pieces being disposed in juxtaposition with said advancing member upon the movement of said web portion to said position, and then releasing said web portion to permit movement of said web along said path, moving said advancing member in a direction parallel to said feed path, said advancing member engaging said one work piece during its movement, to thereby advance said web portion along said feed path to said predetermined work location, thereafter reclamping said web, and, upon the reclamping of said web, performing work at said work location.

References Cited in the file of this patent

UNITED STATES PATENTS

| 763,195 | Merz | June 21, 1904 |
|---|---|---|
| 1,973,798 | Crowley | Sept. 18, 1934 |
| 2,553,709 | Henry | May 22, 1951 |
| 2,622,874 | Haller | Dec. 23, 1952 |
| 2,665,905 | Lyon | Jan. 12, 1954 |
| 2,856,186 | Weymouth | Oct. 14, 1958 |